US012609368B2

(12) United States Patent
Taniuchi et al.

(10) Patent No.: US 12,609,368 B2
(45) Date of Patent: Apr. 21, 2026

(54) HYDROGEN SULFIDE ABSORBING DEVICE

(71) Applicant: HONDA MOTOR CO., LTD., Tokyo (JP)

(72) Inventors: Takuya Taniuchi, Wako (JP); Toshiyuki Ariga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 462 days.

(21) Appl. No.: 18/125,844

(22) Filed: Mar. 24, 2023

(65) Prior Publication Data

US 2023/0318062 A1     Oct. 5, 2023

(30) Foreign Application Priority Data

Mar. 30, 2022    (JP) ................................. 2022-055442

(51) Int. Cl.
| | |
|---|---|
| *H01M 10/052* | (2010.01) |
| *H01M 10/52* | (2006.01) |
| *H01M 10/613* | (2014.01) |
| *H01M 10/615* | (2014.01) |
| *H01M 10/6561* | (2014.01) |

(52) U.S. Cl.
CPC ......... *H01M 10/52* (2013.01); *H01M 10/613* (2015.04); *H01M 10/615* (2015.04); *H01M 10/6561* (2015.04)

(58) Field of Classification Search
CPC .. H01M 10/52; H01M 10/613; H01M 10/615; B10D 53/00; B10D 53/005; B10D 53/02
See application file for complete search history.

(56) References Cited

U.S. PATENT DOCUMENTS

| | | | |
|---|---|---|---|
| 11,011,786 B2 * | 5/2021 | Iwamoto | ............... H01M 10/48 |
| 2007/0028773 A1 | 2/2007 | Jain et al. | |
| 2014/0134466 A1 | 5/2014 | Suzuki et al. | |

(Continued)

FOREIGN PATENT DOCUMENTS

| | | | | |
|---|---|---|---|---|
| CN | 116116165 A | * | 5/2023 | ............. B01D 53/04 |
| JP | 2002-238981 | | 8/2002 | |

(Continued)

OTHER PUBLICATIONS

Japanese Office Action for Japanese Patent Application No. 2022-055442 mailed Oct. 7, 2025.

(Continued)

*Primary Examiner* — Amanda C. Walke
(74) *Attorney, Agent, or Firm* — Amin, Turocy & Watson, LLP

(57) ABSTRACT

A hydrogen sulfide absorbing device capable of efficiently absorbing hydrogen sulfide gas produced in a battery pack with less energy is provided. A hydrogen sulfide absorbing device includes: a battery pack having an all-solid secondary battery cell; a hydrogen sulfide supply part which supplies a hydrogen sulfide-containing gas produced in the battery pack to a hydrogen sulfide absorbing part; a hydrogen sulfide absorbing part having a hydrogen sulfide absorber configured to absorb hydrogen sulfide gas contained in the hydrogen sulfide-containing gas; and a hydrogen sulfide absorber heating part which heats the hydrogen sulfide absorber using waste heat produced by a waste heat generator.

3 Claims, 3 Drawing Sheets

(56)     References Cited

U.S. PATENT DOCUMENTS

| | | | |
|---|---|---|---|
| 2016/0329580 A1 | 11/2016 | Kakuwa et al. | |
| 2017/0309975 A1* | 10/2017 | Iwamoto | H01M 10/52 |
| 2023/0066390 A1* | 3/2023 | Sharafi | H01M 10/48 |
| 2024/0033677 A1* | 2/2024 | Kuppan | B01D 53/0415 |
| 2024/0413415 A1* | 12/2024 | Hagiwara | H01M 10/48 |
| 2025/0023131 A1* | 1/2025 | Ukita | H01M 10/488 |
| 2025/0149665 A1* | 5/2025 | Yamamoto | H01M 10/615 |
| 2025/0253422 A1* | 8/2025 | Oguma | H01M 10/52 |

FOREIGN PATENT DOCUMENTS

| | | | | |
|---|---|---|---|---|
| JP | 2009-504383 | | 2/2009 | |
| JP | 2009-218010 | | 9/2009 | |
| JP | 2018-073802 | | 5/2018 | |
| JP | 2020-202104 | | 12/2020 | |
| JP | 2022014295 A | * | 1/2022 | |
| WO | 2013/021431 | | 2/2013 | |
| WO | WO-2025120753 A1 | * | 6/2025 | H01M 10/6557 |

OTHER PUBLICATIONS

Japanese Notice of Allowance for Japanese Patent Application No. 2022-055442 mailed Mar. 17, 2026.

* cited by examiner

A-A'

B-B'

HYDROGEN SULFIDE ABSORBING DEVICE

BACKGROUND OF THE INVENTION

Field of the Invention

The present invention relates to a hydrogen sulfide absorbing device.

Description of Related Art

In recent years, in order to be able to ensure that more people can access reasonably reliable, sustainable, and advanced energy, research and development on secondary batteries which contribute to efficiently improvement of energy has been carried out.

In recent years, in second batteries, all-solid secondary batteries using a solid electrolyte as an electrolyte have attracted attention. In the related art, there are solid electrolytes using a sulfide-based solid electrolyte as a solid electrolyte for an all-solid secondary battery.

However, in battery packs having all-solid secondary battery cells containing a sulfide-based solid electrolyte, a sulfide-based solid electrolyte in the all-solid secondary battery cell may react with water to produce hydrogen sulfide gas in some cases. There is a concern concerning the production of hydrogen sulfide gas corroding members provided in battery packs, and degrading the battery packs.

Patent Document 1 discloses a battery pack having an adsorbent accommodation part in which an adsorbent capable of adsorbing hydrogen sulfide gas is airtightly enclosed in a packaging material.

PATENT DOCUMENTS

[Patent Document 1] Japanese Unexamined Patent Application, First Publication No. 2020-202104

SUMMARY OF THE INVENTION

Incidentally, a technique relating to a battery pack having an all-solid secondary battery cell is required for more efficiently absorbing hydrogen sulfide gas produced in the battery pack. Particularly, a battery pack having an all-solid secondary battery cell containing a sulfide-based solid electrolyte is likely to produce hydrogen sulfide gas in the battery pack. For this reason, efficiency removal of the hydrogen sulfide gas produced in the battery pack is highly desirable.

Also, in recent years, a battery pack having an all-solid lithium sulfur (LiS) secondary battery cell has attracted attention as an all-solid secondary battery cell. Even in a battery pack having an all-solid lithium sulfur secondary battery cell in which a solid electrolyte which does not contain a sulfide-based solid electrolyte such as an oxide-based solid electrolyte is used, in the all-solid lithium sulfur secondary battery cell, hydrogen sulfide gas may be generated due to sulfur used in a positive electrode combining with hydrogen contained in a binder in some cases.

An object of the present application is to provide a hydrogen sulfide absorbing device which can efficiently absorb hydrogen sulfide gas produced in a battery pack with less energy to solve the above problems and further contribute to improvement in energy efficiency.

In order to achieve the above object, the following means are provided.

[1] A hydrogen sulfide absorbing device comprising:
  a battery pack having an all-solid secondary battery cell;
  a hydrogen sulfide supply part which supplies a hydrogen sulfide-containing gas produced in the battery pack to a hydrogen sulfide absorbing part;
  a hydrogen sulfide absorbing part having a hydrogen sulfide absorber configured to absorb hydrogen sulfide gas contained in the hydrogen sulfide-containing gas; and
  a hydrogen sulfide absorber heating part which heats the hydrogen sulfide absorber using waste heat produced by a waste heat generator.

Since the hydrogen sulfide absorbing device of the above [1] can absorb the hydrogen sulfide gas using the heated hydrogen sulfide absorber, it is possible to efficiently absorb the hydrogen sulfide gas produced in the battery pack. Moreover, in the hydrogen sulfide absorbing device of the above [1], the hydrogen sulfide absorbing device is heated using the exhaust heat generated by the exhaust heat generator. Thus, heating is possible with little energy. Therefore, the hydrogen sulfide absorbing device of the above [1] contributes to efficiency improvement of energy.

[2] The hydrogen sulfide absorbing device set forth in [1], which includes:
  a cooling part which cools a hydrogen sulfide-removed gas containing the hydrogen sulfide-containing gas in contact with the hydrogen sulfide absorber; and
  a hydrogen sulfide-removed gas supply part which supplies the hydrogen sulfide-removed gas cooled using the cooling part to the battery pack.

In the hydrogen sulfide absorbing device of the above [2], the hydrogen sulfide-removed gas cooled using the cooling part is supplied to the battery pack using the hydrogen sulfide-removed gas supply part. For this reason, the inside of the battery pack is cooled, the temperature of the all-solid secondary battery cell can be prevented from becoming too high, charging/discharging in the all-solid secondary battery cells can be efficiently performed, and the deterioration of the battery pack can be prevented. Furthermore, since the cooled hydrogen sulfide-removed gas is supplied into the battery pack in the hydrogen sulfide absorbing device of the above [2], the pressure in the battery pack is stable and the hydrogen sulfide-containing gas produced in the battery pack is likely to be discharged. Thus, a gas can smoothly circulate in the hydrogen sulfide absorbing device.

[3] The hydrogen sulfide absorbing device set forth in [2], which includes: a cooling gas supply part which supplies the hydrogen sulfide-removed gas cooled using the cooling part to the waste heat generator.

In the hydrogen sulfide absorbing device of the above [3], the hydrogen sulfide-removed gas cooled using the cooling part is supplied to the waste heat generator using the cooling gas supply part. For this reason, it is possible to prevent the temperature of the waste heat generator from becoming too hot by cooling the waste heat generator.

[4] The hydrogen sulfide absorbing device according to any one of set forth in [1] to [3], which includes: a heater which heats the hydrogen sulfide absorber.

Since the hydrogen sulfide gas can be absorbed using the hydrogen sulfide absorber which has been sufficiently heated using the heater in the hydrogen sulfide absorbing device of the above [4], it is possible to more efficiently absorb the hydrogen sulfide gas produced in the battery pack.

According to a hydrogen sulfide absorbing device of the present invention, since hydrogen sulfide gas can be absorbed using a heated hydrogen sulfide absorber, the hydrogen sulfide gas produced in a battery pack can be efficiently absorbed. Moreover, since the hydrogen sulfide absorber is heated using the produced waste heat of a waste heat generator in the hydrogen sulfide absorbing device of the present invention, heating is possible with less energy. Therefore, the hydrogen sulfide absorbing device of the present invention contributes to efficiency improvement of energy.

DETAILED DESCRIPTION OF THE INVENTION

Figure 1:
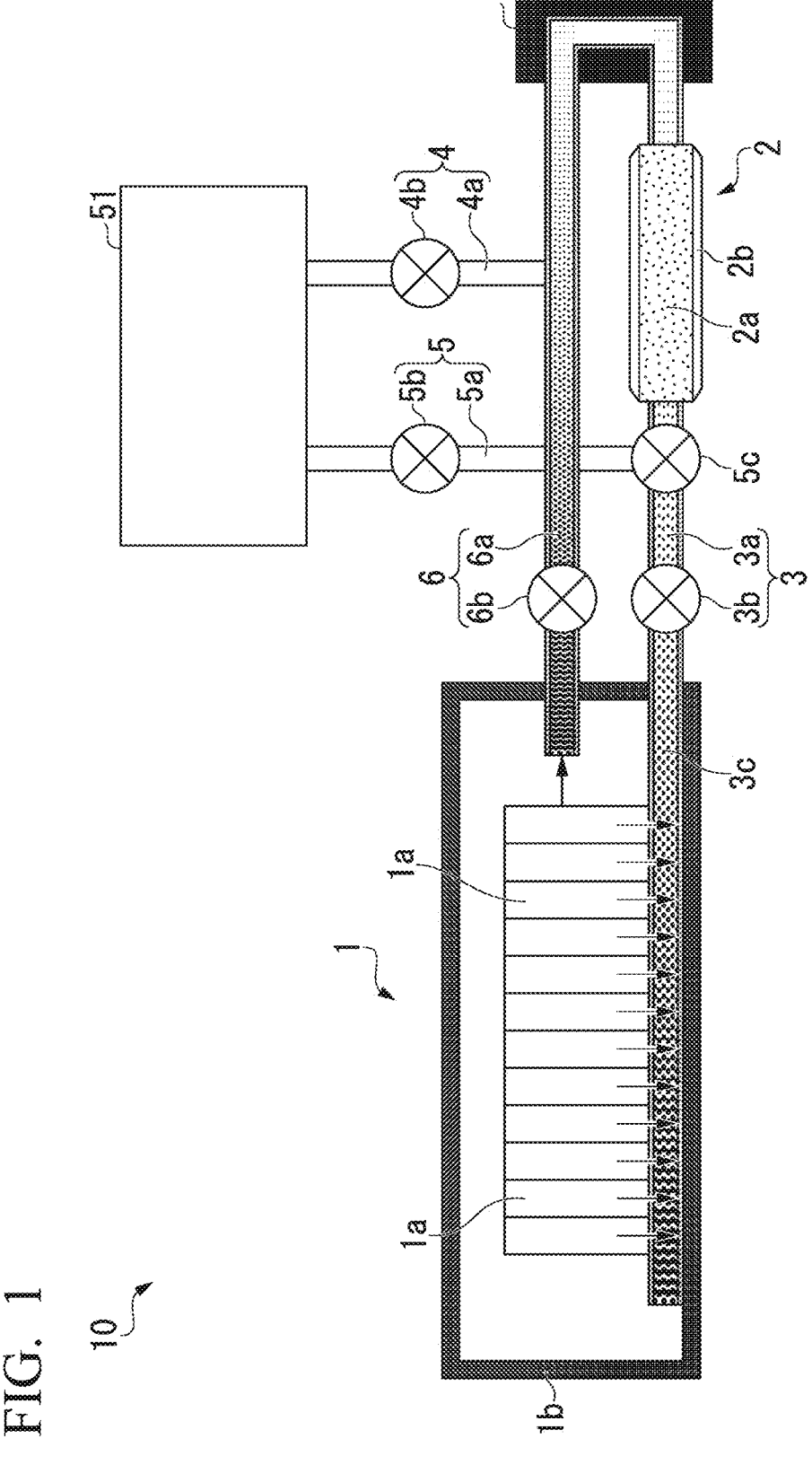
FIG. 1 is a schematic cross-sectional view illustrating a hydrogen sulfide absorbing device according to a first embodiment.

In order to achieve the above object, the inventors of the present invention focused on a relationship between a temperature of a hydrogen sulfide absorber configured to absorb hydrogen sulfide gas produced in a battery pack and an adsorption capacity thereof with respect to hydrogen sulfide gas and conducted intensive research thereon.

Generally, the adsorption capacity with respect to hydrogen sulfide gas of a hydrogen sulfide absorber is superior at a higher temperature (for example, 80° C. or higher) than at room temperature (20° C.). For this reason, the adsorption capacity with respect to hydrogen sulfide gas can be increased by heating a hydrogen sulfide absorber configured to absorb the hydrogen sulfide gas produced in a battery pack.

However, it is not preferable to consume energy to heat a hydrogen sulfide absorber. Furthermore, providing a heating device such as a heater configured to heat a hydrogen sulfide absorber may not be preferable from the viewpoint of reducing a size of an apparatus having a battery pack as a power supply in some cases.

Thus, the inventors of the present invention focused on waste heat discharged from auxiliary devices such as a voltage control device included in an apparatus having a battery pack as a power supply, motors, and apparatuses such as all-solid secondary battery cells included in battery packs and conducted repeated studies thereon. As a result, the inventors found that the waste heat generated from one or more of the above apparatuses can be used for heating a hydrogen sulfide absorber and completed with the present invention.

A hydrogen sulfide absorbing device of an embodiment will be described in detail below with reference to the drawings as appropriate. In the drawings used in the following description, there are cases in which enlarged characteristic portions are provided for convenience to make the characteristics of the present invention easier to understand. Therefore, dimensional ratios of the constituent elements may differ from the actual ones. The materials, the dimensions, and the like exemplified in the following description are examples and the present invention is not limited thereto and it is possible to make appropriate modifications within the scope of not changing the gist of the invention.

First Embodiment

Figure 2A:
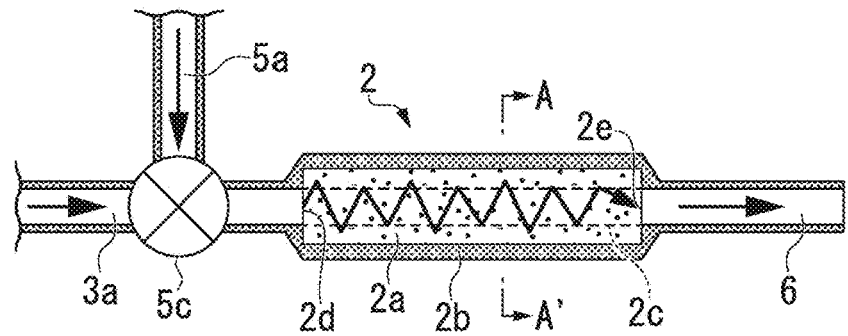
FIG. 2A is an enlarged view illustrating an enlarged part of the hydrogen sulfide absorbing device illustrated in FIG. 1
Figure 2B:
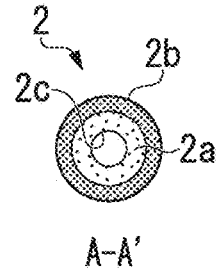
FIG. 2B is a cross-sectional view obtained by cutting along line A-A' illustrated in FIG. 2A.

FIG. 1 is a schematic cross-sectional view illustrating a hydrogen sulfide absorbing device according to a first embodiment. FIG. 2A is an enlarged view illustrating an enlarged part of the hydrogen sulfide absorbing device illustrated in FIG. 1 and FIG. 2B is a cross-sectional view obtained by cutting along line A-A' illustrated in FIG. 2A.

As illustrated in FIG. 1, a hydrogen sulfide absorbing device 10 in the embodiment includes a battery pack 1, a hydrogen sulfide absorbing part 2, a hydrogen sulfide supply part 3, and a hydrogen sulfide absorber heating part 5. As illustrated in FIG. 1, the hydrogen sulfide absorbing device 10 in the embodiment may include a hydrogen sulfide-removed gas supply part 6, a cooling part 7, and a cooling gas supply part 4.

(Battery Pack 1)

As illustrated in FIG. 1, the battery pack 1 has a plurality of all-solid secondary battery cells 1a and a battery case 1b. Although a case in which the battery pack 1 has a plurality of all-solid secondary battery cells 1a will be explained as an example in the embodiment, the number of the all-solid secondary battery cells 1a is not particularly limited and only one all-solid secondary battery cell 1a may be provided and the number is determined appropriately in accordance with the application of the battery pack 1.

As illustrated in FIG. 1, the battery case 1b airtightly accommodates the plurality of all-solid secondary battery cells 1a. Since known battery cases in the related art can be used for the battery case 1b which are made of a material that is not easily corroded by hydrogen sulfide gas, it is preferable that the battery case 1b be made of stainless steel, a carbon fiber, a resin, or a material obtained by combining these with an iron-based material.

The all-solid secondary battery cells 1a has a positive electrode layer (not shown), a negative electrode layer (not shown), and a solid electrolyte layer (not shown) disposed between the positive electrode layer and the negative electrode layer. A positive electrode layer, a negative electrode layer, and a solid electrolyte layer including known materials and structures in the related art can be used as the positive electrode layer, the negative electrode layer, and the solid electrolyte layer, respectively and appropriately determined in accordance with the application of the battery pack 1. The all-solid secondary battery cell 1a may be, for example, an all-solid lithium (Li) secondary battery cell or an all-solid lithium sulfur (LiS) secondary battery cell.

In the all-solid secondary battery cells 1a illustrated in FIG. 1, one or more of the positive electrode layer, the negative electrode layer, and the solid electrolyte layer contain a sulfide-based solid electrolyte. The sulfide-based solid electrolyte may react with water to generate hydrogen sulfide gas. Therefore, in the hydrogen sulfide absorbing device 10 in the embodiment, the effect of absorbing the hydrogen sulfide gas generated in the battery pack 1 using a hydrogen sulfide absorber 2a of the hydrogen sulfide absorbing part 2 becomes significant. Known sulfide-based solid electrolytes in the related art can be used as the sulfide-based solid electrolyte.

Also, when the all-solid secondary battery cells 1*a* are all-solid lithium sulfur secondary battery cells, sulfur used in a positive electrode may combine with hydrogen contained in the binder in an all-solid lithium-sulfur secondary battery cell to generate hydrogen sulfide gas in some cases. Therefore, when the all-solid secondary battery cells 1*a* are all-solid lithium sulfur secondary battery cells, a significant effect when absorbing the hydrogen sulfide gas produced in the battery pack 1 using the hydrogen sulfide absorber 2*a* of the hydrogen sulfide absorbing device 10 in the embodiment is obtained.

Although a case in which the all-solid secondary battery cells 1*a* contain a sulfide-based solid electrolyte has been explained as an example in the embodiment, the all-solid secondary battery cells 1*a* do not contain a sulfide-based solid electrolyte as the solid electrolyte and may use a solid electrolyte which is not a sulfide-based solid electrolyte such as an oxide-based solid electrolyte. A known oxide-based solid electrolyte in the related art can be used as the oxide-based solid electrolyte.

In the embodiment, as illustrated in FIG. 1, the plurality of all-solid secondary battery cells 1*a* are disposed substantially horizontally. A bottom surface of each of the all-solid secondary battery cells 1*a* is joined to a hydrogen sulfide pipe 3*c*. Hydrogen sulfide gas is a gas with a greater density than air. For this reason, if hydrogen sulfide gas is produced in each of the all-solid secondary battery cells 1*a*, a hydrogen sulfide-containing gas is discharged from the all-solid secondary battery cells 1*a* to the hydrogen sulfide pipe 3*c* due to a gravitational force. Known hydrogen sulfide pipes can be used as the hydrogen sulfide pipe 3*c* and the hydrogen sulfide pipe 3*c* is made of a material which is not easily corroded due to hydrogen sulfide gas. Thus, it is preferable that the hydrogen sulfide pipe 3*c* be made of stainless steel, a carbon fiber, a resin, or a material obtained by combining these with an iron-based material.

(Hydrogen Sulfide Supply Part 3)

The hydrogen sulfide supply part 3 supplies a hydrogen sulfide-containing gas produced in the all-solid secondary battery cells 1*a* of the battery pack 1 to the hydrogen sulfide absorbing part 2. The hydrogen sulfide supply part 3 has, for example, a hydrogen sulfide supply pipe 3*a* and an air blower fan 3*b* provided in the hydrogen sulfide supply pipe 3*a*.

As illustrated in FIG. 1, the battery case 1*b* of the battery pack 1 is joined to an end portion of a side (upstream side) of the hydrogen sulfide supply pipe 3*a* into which a hydrogen sulfide-containing gas flows. In the embodiment, as illustrated in FIG. 1, the end portion of the side of the hydrogen sulfide supply pipe 3*a* into which a hydrogen sulfide-containing gas flows passes through the battery case 1*b* of the battery pack 1, extends in the battery pack 1, and joined to the hydrogen sulfide pipe 3*c*. Furthermore, the hydrogen sulfide absorbing part 2 is joined to an end portion of a side (downstream side) opposite to the side of the hydrogen sulfide supply pipe 3*a* into which a hydrogen sulfide-containing gas flows.

The air blower fan 3*b* causes the hydrogen sulfide-containing gas passing through the hydrogen sulfide supply pipe 3*a* to flow from the upstream side to the downstream side. Only one air blower fan 3*b* may be provided as illustrated in FIG. 1 or two or more air blower fans 3*b* may be provided.

Known hydrogen sulfide supply pipes and air blower fans be used as the hydrogen sulfide supply pipe 3*a* and the air blower fan 3*b*. The hydrogen sulfide supply pipe 3*a* and the air blower fan 3*b* are made of materials which are not easily corroded due to hydrogen sulfide gas. Thus, it is preferable that the hydrogen sulfide supply pipe 3*a* and the air blower fan 3*b* be made of stainless steel, a carbon fiber, a resin, or a material obtained by combining these with an iron-based material.

(Hydrogen Sulfide Absorbing Part 2)

The hydrogen sulfide absorbing part 2 has the hydrogen sulfide absorber 2*a* configured to absorb hydrogen sulfide gas contained in a hydrogen sulfide-containing gas and an absorber case 2*b*.

The absorber case 2*b* accommodates the hydrogen sulfide absorber 2*a*. As illustrated in FIG. 1, the absorber case 2*b* has a substantially cylindrical shape. As illustrated in FIGS. 1 and 2A, an inner diameter of the absorber case 2*b* is larger than an inner diameter of the hydrogen sulfide supply pipe 3*a*. This is because in this case an area of the hydrogen sulfide absorber 2*a* in contact with a hydrogen sulfide-containing gas can be secured and the hydrogen sulfide absorber 2*a* absorbs the hydrogen sulfide gas contained in the hydrogen sulfide-containing gas more efficiently.

Although a case in which the absorber case 2*b* is substantially cylindrical will be described as an example in the embodiment, a shape of the absorber case 2*b* is not limited to substantially cylindrical and can be appropriately determined in accordance with the shape or the like of the hydrogen sulfide absorber 2*a*.

In the absorber case 2*b* illustrated in FIG. 1, as illustrated in FIG. 2A, an inlet port 2*d* through which a hydrogen sulfide-containing gas flows is provided at one end (upstream side) of a substantial cylindrical end portion in a length direction and an outlet port 2*e* through which a hydrogen sulfide-containing gas which has passed in the absorber case 2*b* is discharged is provided at the other end portion (downstream side). The hydrogen sulfide supply pipe 3*a* of the hydrogen sulfide supply part 3 is joined to the inlet port 2*d* of the absorber case 2*b*. The hydrogen sulfide-removed gas supply part 6 is joined to the outlet port 2*e* of the absorber case 2*b*.

Since a material of the absorber case 2*b* is a material which is not easily corroded due to hydrogen sulfide gas, it is preferable that stainless steel, a carbon fiber, a resin, or materials obtained by combining these with an iron-based material be used as the material of the absorber case 2*b*.

In the hydrogen sulfide absorbing device 10 in the embodiment, as illustrated in FIGS. 2A and 2B, the sheet-like hydrogen sulfide absorber 2*a* is installed on the entire inner side surface of the absorber case 2*b* having a substantial tubular shape. Furthermore, as illustrated in FIGS. 2A and 2B, a hollow linear flow path 2*c* through which a hydrogen sulfide-containing gas flows is formed inside the hydrogen sulfide absorber 2*a* installed in the absorber case 2*b* along a central axis with a substantial tubular shape of the absorber case 2*b*. Therefore, in the hydrogen sulfide absorbing device 10 in the embodiment, the hydrogen sulfide-containing gas which has flowed into the absorber case 2*b* of the hydrogen sulfide absorbing part 2 passes in the hydrogen sulfide absorbing part 2 while being in contact with the hydrogen sulfide absorber 2*a* disposed to surround the flow path 2*c*. Furthermore, since the linear flow path 2*c* is formed inside the hydrogen sulfide absorber 2*a* in the hydrogen sulfide absorbing device in the embodiment, a flow rate of the hydrogen sulfide-containing gas flowing into the hydrogen sulfide absorbing part 2 can be increased and the hydrogen sulfide-containing gas can pass through the hydrogen sulfide absorbing part 2 more efficiently, compared to when the flow path 2c is not linear.

As a material of the hydrogen sulfide absorber 2a, materials may be used as long as the materials can absorb hydrogen sulfide gas. In addition, materials which absorb hydrogen sulfide gas through physical adsorption may be used, material which absorb hydrogen sulfide gas through chemical adsorption may be used, materials which absorb hydrogen sulfide gas through physical adsorption and chemical adsorption may be used, and known materials in the related art can be used. As the material of the hydrogen sulfide absorber 2a, it is preferable to use materials which absorb hydrogen sulfide gas through chemical adsorption or materials which absorb hydrogen sulfide gas through physical adsorption and chemical adsorption. This is because the adsorption capacity of hydrogen sulfide gas is good and the effect of increasing the adsorption capacity of hydrogen sulfide gas by heating the hydrogen sulfide absorber 2a to a temperature higher than room temperature (20° C.) is significant.

As the hydrogen sulfide absorber 2a which absorbs hydrogen sulfide gas through physical adsorption, specifically, activated carbon, zeolite, silica gel, and the like are exemplified. Among these, activated carbon can be preferably used. This is because activated carbon is easy to obtain and hydrogen sulfide gas as well as unnecessary compound components contained in the hydrogen sulfide-containing gas such as a fluoride-based gas derived from a binder or the like contained in the all-solid secondary battery cell 1a can be adsorbed and removed.

As the hydrogen sulfide absorber 2a which absorbs hydrogen sulfide gas through physical adsorption and chemical adsorption, specifically, materials and the like which support a metal such as Cu on activated carbon can be used.

As the hydrogen sulfide absorber 2a which absorbs hydrogen sulfide gas through chemical adsorption, specifically, alkaline substances such as NaOH, KOH, $Ca(OH)_2$, and $Mg(OH)_2$, metals such as Fe, Cu, and Ag, oxides of these metals, and the like are exemplified. As the oxides of the metals used as the hydrogen sulfide absorber 2a, for example, iron oxide is exemplified. When iron oxide is used as the hydrogen sulfide absorber 2a, hydrogen sulfide-containing gas can be adsorbed more efficiently by heating the hydrogen sulfide absorber 2a to 100° C. to 250° C.

The sheet-like hydrogen sulfide absorber 2a can be produced, for example, through a method which will be shown below. First, a paste containing a powder made of any of the above-described materials of the hydrogen sulfide absorber 2a and a known binder is prepared. The obtained paste is applied onto a substrate and dried. Thus, the powder made of the material of the hydrogen sulfide absorber 2a is bound together by the binder to form the sheet-like hydrogen sulfide absorber 2a. The sheet-like hydrogen sulfide absorber 2a obtained in this way may be used after peeling off from the substrate or may be used in a state of being integrated with the substrate.

As the material of the substrate, known materials can be used. The material of the substrate can be appropriately selected in accordance with whether the sheet-like hydrogen sulfide absorber 2a is to be used after being separated from the substrate or used in a state of being integrated with the substrate.

When the sheet-like hydrogen sulfide absorber 2a is used in a state integrated with the substrate, substrates having a plurality of through holes through which a hydrogen sulfide-containing gas can pass may be used as the substrate. In this case, the sheet-like hydrogen sulfide absorber 2a integrated with the substrate may be installed so that the substrate side faces the side of the flow path 2c or the substrate side faces a side opposite to the flow path 2c. When a substrate in which through holes through which a hydrogen sulfide-containing gas can pass are not provided is used as the substrate, the substrate side of the sheet-like hydrogen sulfide absorber 2a is installed so that the substrate side faces the side opposite to the flow path 2c.

The sheet-like hydrogen sulfide absorber 2a may be formed, for example, through a method of applying a paste containing a powder made of any of the above-described materials of the hydrogen sulfide absorber 2a and a known binder onto the entire inner side surface of the absorber case 2b and drying it. As the method of applying the paste onto the absorber case 2b, known methods such as a method of spraying the paste onto the absorber case 2b using a spraying device can be used.

(Hydrogen Sulfide Absorber Heating Part 5)

The hydrogen sulfide absorber heating part 5 heats the hydrogen sulfide absorber 2a using the waste heat produced by a waste heat generator 51. The hydrogen sulfide absorber heating part 5 in the embodiment mixes a waste heat gas heated using the waste heat and a hydrogen sulfide-containing gas to generate a high-temperature mixed gas and supplies the generated high-temperature mixed gas to the hydrogen sulfide absorber 2a via the hydrogen sulfide supply pipe 3a.

As the waste heat generator 51 which generates waste heat, for example, various apparatuses provided in the apparatus having the battery pack 1 as a power supply may be exemplified. For example, when the apparatus having the battery pack 1 as a power supply is a vehicle such as an electric vehicle, a hybrid vehicle, or the like, as the waste heat generator 51 provided in the vehicle, auxiliary devices such as a voltage control device, an onboard charger, and a control device (power drive unit (PDU)) configured to control a motor, a motor, and the like are exemplified. Among these, it is preferable to include a motor as the waste heat generator 51 because of a large amount of waste heat.

Also, in the hydrogen sulfide absorbing device 10 in the embodiment, the all-solid secondary battery cells 1a of the battery pack 1 may be used as the waste heat generator 51.

In the hydrogen sulfide absorbing device 10 in the embodiment, only one waste heat generator 51 used for heating the hydrogen sulfide absorber 2a may be provided or two or more waste heat generators 51 may be provided.

The hydrogen sulfide absorber heating part 5 includes, for example, a waste heat supply pipe 5a configured to connect the waste heat generator 51 and a mixing valve 5c, an air blower fan 5b provided in the waste heat supply pipe 5a, and the mixing valve 5c configured to mix a waste heat gas and a hydrogen sulfide-containing gas.

As illustrated in FIG. 1, the waste heat produced by the waste heat generator 51 is supplied to the end portion of the waste heat supply pipe 5a on the side (upstream side) into which the waste heat gas flows. As the method of supplying the waste heat produced by the waste heat generator 51 to the waste heat supply pipe 5a, known methods can be used and methods can be appropriately determined in accordance with a type of the exhaust heat generator 51. Furthermore, as illustrated in FIG. 1, the mixing valve 5c is joined to the end portion of the waste heat supply pipe 5a on the side (downstream side) opposite to the side into which the waste heat gas flows.

The mixing valve 5c mixes the waste heat gas flowing in through the waste heat supply pipe 5a with the hydrogen sulfide-containing gas flowing in through the hydrogen sulfide supply pipe 3a at an arbitrary ratio. A mixing ratio of the waste heat gas and the hydrogen sulfide-containing gas can be appropriately determined in accordance with the temperatures of the waste heat gas and the hydrogen sulfide-containing gas, the concentrations of the hydrogen sulfide gas contained in the hydrogen sulfide-containing gas, and the like. When the hydrogen sulfide-containing gas is heated using the waste heat produced by the all-solid secondary battery cells 1a, the waste heat gas flowing in through the waste heat supply pipe 5a may be mixed in by adjusting the mixing valve 5c.

As the mixing valve 5c, mixing valves capable of mixing the waste heat gas and the hydrogen sulfide-containing gas at an arbitrary ratio can be used or known mixing valves can be used. As the mixing valve 5c, it is preferable to use a mixing valve made of stainless steel, a carbon fiber, a resin, or a material obtained by combining these with an iron-based material because the material is a material which is not easily corroded due to hydrogen sulfide gas.

The air blower fan 5b flows the waste heat gas in the waste heat supply pipe 5a from the upstream side to the downstream side. Only one air blower fan 5b may be provided as illustrated in FIG. 1 or two or more air blower fans 5b may be provided.

Known waste heat supply pipes and air blower fans can be used as the waste heat supply pipe 5a and the air blower fan 5b.

(Hydrogen Sulfide-Removed Gas Supply Part 6)

The sulfide-hydrogen-removed gas supply part 6 supplies the hydrogen-sulfide-containing gas and the hydrogen-sulfide-removed gas containing the waste heat gas in contact with the hydrogen sulfide absorber 2a to the cooling part 7 by passing it through the hydrogen sulfide absorbing part 2 and supplies the sulfide-hydrogen-removed gas cooled using the cooling part 7 into the battery pack 1.

The hydrogen sulfide-removed gas supply part 6 has, for example, a hydrogen sulfide-removed gas supply pipe 6a and an air blower fan 6b provided in the hydrogen sulfide-removed gas supply pipe 6a.

As illustrated in FIG. 1, the outlet port 2e of the absorber case 2b of the hydrogen sulfide absorbing part 2 is joined to the end portion of the hydrogen sulfide-removed gas supply pipe 6a on the side (upstream side) into which the hydrogen-sulfide-removed gas flows. Furthermore, the battery pack 1 is joined to the end portion of the hydrogen sulfide-removed gas supply pipe 6a on the side (downstream side) opposite to the side into which the hydrogen-sulfide-removed gas flows. In the embodiment, as illustrated in FIG. 1, the end portion of the hydrogen sulfide-removed gas supply pipe 6a on the downstream side passes through the battery case 1b of the battery pack 1 and extends into the battery pack 1.

The air blower fan 6b flows the hydrogen-sulfide-removed gas in the hydrogen sulfide-removed gas supply pipe 6a from the upstream side to the downstream side. Only one air blower fan 6b may be provided as illustrated in FIG. 1 or two or more air blower fans 6b may be provided.

Known hydrogen sulfide-removed gas supply pipes and air blower fans can be used as the hydrogen sulfide-removed gas supply pipe 6a and the air blower fan 6b.

(Cooling Part 7)

The cooling part 7 cools the hydrogen-sulfide-removed gas containing the hydrogen sulfide-containing gas and the waste heat gas in contact with the hydrogen sulfide absorber 2a by passing it through the hydrogen sulfide absorbing part 2. The cooling part 7 illustrated in FIG. 1 has a case disposed to surround the hydrogen sulfide-removed gas supply pipe

6a and a cooling medium circulating in the case. The cooling part 7 cools an outer surface of the hydrogen sulfide-removed gas supply pipe 6a disposed in contact with the cooling part 7. Thus, the hydrogen-sulfide-removed gas passing in the hydrogen sulfide-removed gas supply pipe 6a is cooled via the hydrogen sulfide-removed gas supply pipe 6a.

The cooling part 7 is not limited to the cooling part 7 illustrated in FIG. 1. As the cooling part 7, known cooling parts can be used. The cooling part 7 may be, for example, a cooling device which shares a cooling medium with a cooling device which cools various apparatuses provided in the apparatus having the battery pack 1 as a power supply and/or a cooling device which cools the all-solid secondary battery cells 1a included in the battery pack 1.

The cooling part 7 illustrated in FIG. 1, for example, may also serve as a cooling device configured to cool the all-solid secondary battery cells 1a included in the battery pack 1 when the temperature thereof becomes too high. Specifically, the all-solid secondary battery cells 1a may be cooled using the hydrogen-sulfide-removed gas cooled through the cooling part 7.

(Cooling Gas Supply Part 4)

In the hydrogen sulfide absorbing device 10 in the embodiment, the cooling gas supply part 4 configured to supply the hydrogen-sulfide-removed gas cooled through the cooling part 7 to the waste heat generator 51 is provided.

Therefore, the cooling part 7 illustrated in FIG. 1 also serves as a cooling device which cools various apparatuses provided in the apparatus having the battery pack 1 as a power supply.

The cooling gas supply part 4 has, for example, a cooling gas supply pipe 4a and an air blower fan 4b provided in the cooling gas supply pipe 4a.

As illustrated in FIG. 1, the hydrogen sulfide-removed gas supply pipe 6a of the hydrogen sulfide-removed gas supply part 6 is joined to the end portion of the cooling gas supply pipe 4a on the side (upstream side) into which the cooled hydrogen-sulfide-removed gas flows. The joining location of the cooling gas supply pipe 4a to the hydrogen sulfide-removed gas supply pipe 6a is located on a downstream side relative to the location in the hydrogen sulfide-removed gas supply pipe 6a in which the cooling part 7 is disposed.

Also, the cooled hydrogen-sulfide-removed gas is supplied to the waste heat generator 51 from the end portion of the cooling gas supply pipe 4a on the side (downstream side) opposite to the side into which the cooled hydrogen-sulfide-removed gas flows. As a method of supplying the cooled hydrogen-sulfide-removed gas to the waste heat generator 51, known methods can be used and methods can be appropriately determined in accordance with a type of waste heat generator 51.

The air blower fan 4b flows the cooled hydrogen-sulfide-removed gas in the cooling gas supply pipe 4a from the upstream side to the downstream side. Only one air blower fan 4b may be provided as illustrated in FIG. 1 or two or more air blower fans 4b may be provided.

Known cooling gas supply pipes and air blower fans can be used as the cooling gas supply pipe 4a and the air blower fan 4b.

(Hydrogen Sulfide Absorption Method)

A method of absorbing and removing hydrogen sulfide gas from a hydrogen sulfide-containing gas produced in a battery pack will be described below with an example using the hydrogen sulfide absorbing device 10 in the embodiment.

In the hydrogen sulfide absorbing device 10 illustrated in FIG. 1, the all-solid secondary battery cells 1*a* included in the battery pack 1 contain a sulfide-based solid electrolyte. For this reason, if water enters the all-solid secondary battery cells 1*a*, the sulfide-based solid electrolyte and water may react with each other to produce hydrogen sulfide gas in some cases.

If hydrogen sulfide gas is generated in the all-solid secondary battery cells 1*a*, as illustrated in FIG. 1, a hydrogen sulfide-containing gas containing hydrogen sulfide gas and having a larger mass than air flows into the hydrogen sulfide pipe 3*c* joined to the bottom surface of each of the all-solid secondary battery cells 1*a* due to a gravitational force.

The all-solid secondary battery cells 1*a* may generate heat as they are charged and discharged in some cases. In the case in which hydrogen sulfide gas is generated when the all-solid secondary battery cells 1*a* generate heat, the hydrogen sulfide-containing gas flowing into the hydrogen sulfide pipe 3*c* is heated using the waste heat produced by the all-solid secondary battery cells 1*a*. The heated hydrogen sulfide-containing gas heats the hydrogen sulfide absorber 2*a* when passing in the hydrogen sulfide absorbing part 2. Therefore, the all-solid secondary battery cells 1*a* may function as the waste heat generator 51 in some cases.

Also, when the all-solid secondary battery cells 1*a* generate heat, hydrogen sulfide gas is likely to be generated in the all-solid secondary battery cells 1*a*. Particularly, when the temperature of the all-solid secondary battery cells 1*a* is 80° C. or higher, an amount of hydrogen sulfide gas which is generated in the all-solid secondary battery cells 1*a* tends to increase. For this reason, when the hydrogen sulfide absorber 2*a* is heated using the waste heat produced by the all-solid secondary battery cells 1*a*, the effect of efficiently absorbing hydrogen sulfide gas using the heated hydrogen sulfide absorber 2*a* becomes even more significant.

The hydrogen sulfide-containing gas which has flowed into the hydrogen sulfide pipe 3*c* is sent to the mixing valve 5*c* via the hydrogen sulfide supply pipe 3*a* using the air blower fan 3*b* provided in the hydrogen sulfide supply pipe 3*a* of the hydrogen sulfide supply part 3.

Also, in the embodiment, the waste heat gas heated using the waste heat produced by the waste heat generator 51 is sent to the mixing valve 5*c* via the waste heat supply pipe 5*a* using the air blower fan 5*b* provided in the waste heat supply pipe 5*a* of the hydrogen sulfide absorber heating part 5.

Moreover, as illustrated in FIGS. 1 and 2A, the hydrogen sulfide-containing gas which flowed in through the hydrogen sulfide supply pipe 3*a* and the waste heat gas which flowed in through the waste heat supply pipe 5*a* are mixed using the mixing valve 5*c*. The mixed gas of the hydrogen sulfide-containing gas and the waste heat gas mixed using the mixing valve 5*c* is sent to the inlet port 2*d* of the absorber case 2*b* of the hydrogen sulfide absorbing part 2 via the hydrogen sulfide supply pipe 3*a*. When the temperature of the waste heat gas which has flowed in through the waste heat supply pipe 5*a* is higher than the temperature of the hydrogen sulfide-containing gas sent to the mixing valve 5*c*, the temperature of the mixed gas of the hydrogen sulfide-containing gas and the waste heat gas is higher than the temperature of the hydrogen sulfide-containing gas.

The mixed gas of the hydrogen sulfide-containing gas and the waste heat gas which flowed from the inlet port 2*d* into the absorber case 2*b* passes in the hydrogen sulfide absorbing part 2 while in contact with the hydrogen sulfide absorber 2*a* disposed to surround the flow path 2*c*. Thus, the hydrogen sulfide contained in the hydrogen sulfide-containing gas is absorbed by the hydrogen sulfide absorber 2*a*.

The hydrogen-sulfide-removed gas composed of the mixed gas of the hydrogen sulfide-containing gas and the waste heat gas in contact with the hydrogen sulfide absorber 2*a* is discharged from the outlet port 2*e* of the absorber case 2*b* of the hydrogen sulfide absorbing part 2 and flows into the hydrogen sulfide-removed gas supply pipe 6*a* of the hydrogen sulfide-removed gas supply part 6. The hydrogen-sulfide-removed gas which has flowed into the hydrogen sulfide-removed gas supply pipe 6*a* is supplied to the cooling part 7 using the air blower fan 6*b* provided in the hydrogen sulfide-removed gas supply pipe 6*a*.

The hydrogen-sulfide-removed gas supplied to the cooling part 7 is cooled using the cooling part 7 via the hydrogen sulfide-removed gas supply pipe 6*a*. The hydrogen-sulfide-removed gas cooled using the cooling part 7 is supplied into the battery pack 1 using the air blower fan 6*b*. Thus, the inside of the battery pack 1 can be cooled to prevent the temperature of the all-solid secondary battery cells 1*a* from becoming too high, charging and discharging in the all-solid secondary battery cells 1*a* can be efficiently performed, and deterioration of the battery pack can be prevented. Furthermore, since the hydrogen-sulfide-removed gas cooled using the cooling part 7 is supplied into the battery pack 1 in the hydrogen sulfide absorbing device 10 in the embodiment, the pressure in the battery pack 1 is stable and the hydrogen sulfide-containing gas produced in the battery pack 1 flows into the hydrogen sulfide pipe 3*c* and is easily discharged. Thus, a gas can smoothly circulate in the hydrogen sulfide absorbing device 10.

Also, in the hydrogen sulfide absorbing device 10 in the embodiment, a part of the hydrogen sulfide-removed gas cooled using the cooling part 7 is supplied to the waste heat generator 51. Specifically, as illustrated in FIG. 1, a part of the hydrogen sulfide-removed gas cooled using the cooling part 7 is sent to the cooling gas supply pipe 4*a* joined to a location in the hydrogen sulfide-removed gas supply pipe 6*a* on the downstream side relative to the location therein in which the cooling part 7 is disposed. The hydrogen-sulfide-removed gas sent to the cooling gas supply pipe 4*a* is supplied to the waste heat generator 51 using the air blower fan 4*b*. Thus, the waste heat generator 51 is cooled and the temperature of the waste heat generator 51 can be prevented from becoming too high.

The hydrogen sulfide absorbing device 10 in the embodiment includes the hydrogen sulfide supply part 3 which supplies the hydrogen sulfide-containing gas produced in the battery pack 1 to the hydrogen sulfide absorbing part 2, the hydrogen sulfide absorbing part 2 which has the hydrogen sulfide absorber 2*a* configured to absorb the hydrogen sulfide gas contained in the hydrogen sulfide-containing gas, and the hydrogen sulfide absorber heating part 5 which heats the hydrogen sulfide absorber 2*a* using the waste heat produced by the waste heat generator 51. For this reason, according to the hydrogen sulfide absorbing device 10 in the embodiment, the hydrogen sulfide gas can be absorbed using the heated hydrogen sulfide absorber 2*a* and the hydrogen sulfide gas produced in the battery pack 1 can be efficiently absorbed. Moreover, since the hydrogen sulfide absorber 2*a* is heated using the waste heat produced by the waste heat generator 51 in the hydrogen sulfide absorbing device 10 in the embodiment, the hydrogen sulfide absorber 2*a* can be heated with less energy. Therefore, the hydrogen sulfide absorbing device 10 in the embodiment contributes to efficiency improvement of energy. Furthermore, since the hydrogen sulfide absorbing device 10 in the embodiment includes the hydrogen sulfide absorber heating part 5 which heats the hydrogen sulfide absorber 2a using the waste heat produced by the waste heat generator 51, there is no need to install a new heating device such as a heater to heat the hydrogen sulfide absorber 2a.

Although a case in which the hydrogen sulfide absorbing device 10 in the embodiment includes the hydrogen sulfide-removed gas supply part 6, the cooling part 7, and the cooling gas supply part 4 as illustrated in FIG. 1 has been described as an example, the hydrogen sulfide absorbing device 10 may or may not include the hydrogen sulfide-removed gas supply part 6, the cooling part 7, and the cooling gas supply part 4 as necessary.

Second Embodiment

Figure 3A:
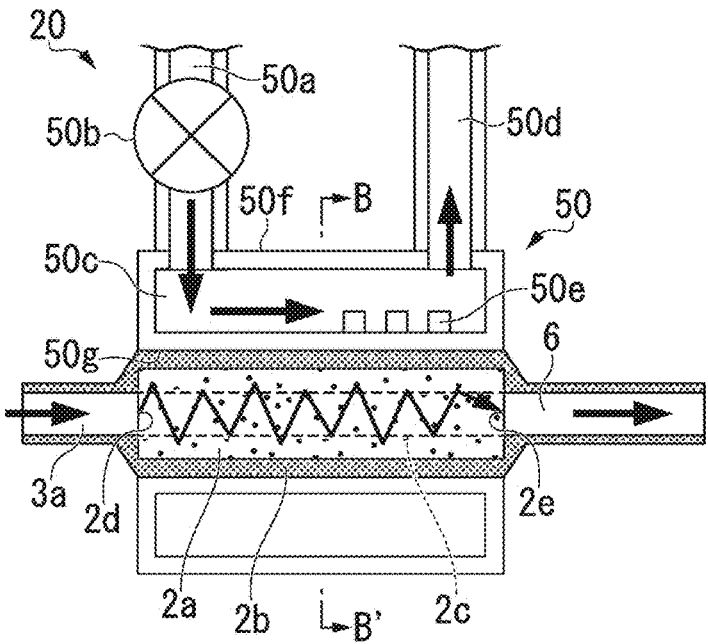
FIG. 3A is a schematic cross-sectional view illustrating an enlarged part of a hydrogen sulfide absorbing device according to a second embodiment and FIG. 3B is a cross-sectional view obtained by cutting along line B-B' illustrated in FIG. 3A.
Figure 3B:
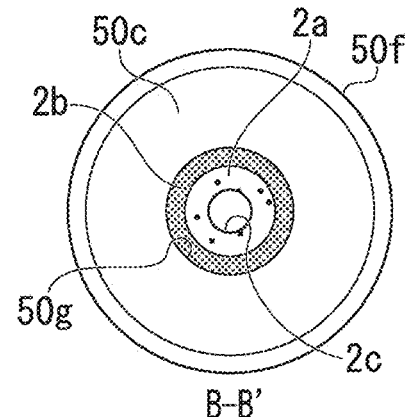

FIG. 3A is a schematic cross-sectional view illustrating an enlarged part of a hydrogen sulfide absorbing device according to a second embodiment. FIG. 3B is a cross-sectional view obtained by cutting along line B-B' illustrated in FIG. 3A.

In a hydrogen sulfide absorbing device 20 according to the second embodiment, constituent elements that are the same as those in the hydrogen sulfide absorbing device according to the first embodiment will be the same reference numerals and description thereof will be omitted.

The hydrogen sulfide absorbing device 20 according to the second embodiment and the hydrogen sulfide absorbing device 10 in the first embodiment differ only in that, in the hydrogen sulfide absorbing device 20 according to the second embodiment, the cooling gas supply part 4 in the hydrogen sulfide absorbing device 10 illustrated in FIG. 1 is not provided and a shape of the hydrogen sulfide absorber heating part differs.

(Hydrogen Sulfide Absorber Heating Part 50)

As illustrated in FIGS. 3A and 3B, a hydrogen sulfide absorber heating part 50 in the embodiment has, for example, a main body 50f, a waste heat supply pipe 50a configured to connect a hollow space 50c and a waste heat generator 51 provided in the main body 50f, an air blower fan 50b provided in the waste heat supply pipe 50a, convex parts 50e formed on an inner wall in the space 50c on a side in contact with the absorber case 2b, and a waste heat discharge pipe 50d configured to discharge waste heat gas from the space 50c in the main body 50f.

As illustrated in FIGS. 3A and 3B, the main body 50f of the hydrogen sulfide absorber heating part 50 has a substantially tubular shape. The main body 50f is made of a material with good thermal conductivity such as a metal. An absorber case installation region 50g including a substantially tubular space having an inner diameter corresponding to an outer diameter of the absorber case 2b along a central axis is provided in the main body 50f. In the embodiment, the absorber case 2b is installed in the absorber case installation region 50g and the inner wall of the absorber case installation region 50g and the outer surface of the absorber case 2b are disposed in contact with each other.

The annular space 50c is formed in the main body 50f. As illustrated in FIG. 3A, the plurality of convex parts 50e are formed on the inner wall in the space 50c on the side in contact with the absorber case 2b. The convex parts 50e function as a heat sink and efficiently heat the absorber case 2b by increasing contact areas between the waste heat gas moving in the space 50c and the main body 50f.

The waste heat produced by the waste heat generator 51 (refer to FIG. 1; not shown in FIGS. 3A and 3B) is supplied to an end of the waste heat supply pipe 50a on a side (upstream side) into which the waste heat gas flows. The space 50c in the main body 50f is combined with an end portion of the waste heat supply pipe 50a on a side (downstream side) opposite to the side into which the waste heat gas flows.

The air blower fan 50b flows the waste heat gas in the waste heat supply pipe 5a from the upstream side to the downstream side. Only one air blower fan 50b may be provided as illustrated in FIG. 3A or two or more air blower fans 50b may be provided.

The space 50c in the main body 50f is combined with the end portion of the waste heat discharge pipe 50d and the waste heat gas which has passed in the space 50c flows into the end portion of the waste heat discharge pipe 50d. The end portion of the waste heat discharge pipe 50d on the side (downstream side) opposite to the side (upstream side) into which the waste heat gas flows may be joined to the cooling device or opened to the outside.

Known waste heat supply pipes, waste heat discharge pipes, and air blower fans can be used as the waste heat supply pipe 50a, the waste heat discharge pipe 50d, and the air blower fan 50b.

The hydrogen sulfide absorber heating part 50 in the embodiment heats the hydrogen sulfide absorber 2a using the waste heat produced by the waste heat generator 51 (refer to FIG. 1) as in the hydrogen sulfide absorber heating part 5 in the first embodiment. However, the hydrogen sulfide absorber heating part 50 in the embodiment heats the hydrogen sulfide absorber 2a via the absorber case 2b of the hydrogen sulfide absorbing part 2 using the waste heat gas heated using the waste heat unlike the hydrogen sulfide absorber heating part 5 in the first embodiment. For this reason, in the hydrogen sulfide absorbing device 20 in the embodiment, the waste heat gas is not mixed with the hydrogen sulfide-containing gas or is not in contact with any member in the battery pack 1. Thus, in the embodiment, even if the waste heat gas contains the contamination such as an iron powder caused due to the waste heat generator 51 such as a motor, the contamination component does not enter the battery pack 1. Therefore, the matters such as short circuits due to the contamination component entering the battery pack 1 do not occur.

(Hydrogen Sulfide Absorption Method)

A method of absorbing and removing hydrogen sulfide gas from the hydrogen sulfide-containing gas produced in the battery pack 1 using the hydrogen sulfide absorbing device 20 in the embodiment will be described below as an example.

In the hydrogen sulfide absorbing device 20 in the embodiment, the waste heat gas heated using the waste heat produced by the waste heat generator 51 is sent to the space 50c in the main body 50f via the waste heat supply pipe 50a using the air blower fan 50b provided in the waste heat supply pipe 50a of the hydrogen sulfide absorber heating part 50. The waste heat gas sent to the space 50c heats the absorber case 2b via the inner wall in the space 50c on side in contact with the absorber case 2b while moving in the space 50c and is discharged via the waste heat discharge pipe 50d.

If hydrogen sulfide gas is generated in the all-solid secondary battery cells 1a in the hydrogen sulfide absorbing device 20 in the embodiment, the hydrogen sulfide gas flows into the hydrogen sulfide pipe 3c as in the first embodiment.

The hydrogen sulfide-containing gas which has flowed into the hydrogen sulfide pipe 3c is sent to the inlet port 2d of the absorber case 2b of the hydrogen sulfide absorbing part 2 using the air blower fan 3b provided in the hydrogen sulfide supply pipe 3a of the hydrogen sulfide supply part 3. The hydrogen sulfide-containing gas which has flowed from the inlet port 2d into the absorber case 2b passes in the hydrogen sulfide absorbing part 2 while in contact with the hydrogen sulfide absorber 2a which has been heated using the waste heat gas sent to the space 50c of the hydrogen sulfide absorber heating part 50. Thus, the hydrogen sulfide contained in the hydrogen sulfide-containing gas is absorbed by the hydrogen sulfide absorber 2a.

The hydrogen-sulfide-removed gas composed of the hydrogen sulfide-containing gas in contact with the hydrogen sulfide absorber 2a is discharged through the outlet port 2e of the absorber case 2b of the hydrogen sulfide absorbing part 2, flows into the hydrogen sulfide-removed gas supply pipe 6a of the hydrogen sulfide-removed gas supply part 6, and is cooled via the hydrogen sulfide-removed gas supply pipe 6a using the cooling part 7, as in the first embodiment. The hydrogen-sulfide-removed gas cooled using the cooling part 7 is supplied into the battery pack 1 using the air blower fan 6b.

The hydrogen sulfide absorbing device 20 in the embodiment includes the hydrogen sulfide supply part 3 which supplies the hydrogen sulfide-containing gas produced in the battery pack 1 to the hydrogen sulfide absorbing part 2, the hydrogen sulfide absorbing part 2 having the hydrogen sulfide absorber 2a configured to absorb the hydrogen sulfide gas contained in the hydrogen sulfide-containing gas, and the hydrogen sulfide absorber heating part 50 which heats the hydrogen sulfide absorber 2a using the waste heat produced by the waste heat generator 51. For this reason, according to the hydrogen sulfide absorbing device 20 in the embodiment, the hydrogen sulfide gas can be absorbed using the heated hydrogen sulfide absorber 2a and the hydrogen sulfide gas produced in the battery pack 1 can be efficiently absorbed. Moreover, since the hydrogen sulfide absorber 2a is heated using the waste heat produced by the waste heat generator 51 in the hydrogen sulfide absorbing device 20 in the embodiment, the hydrogen sulfide absorber 2a can be heated with less energy. Therefore, the hydrogen sulfide absorbing device 20 in the embodiment contributes to efficiency improvement of energy.

Although a case in which the hydrogen sulfide absorbing device 20 in the embodiment includes the hydrogen sulfide-removed gas supply part 6 and the cooling part 7 has been described as an example, the hydrogen sulfide absorbing device 20 may or may not include the hydrogen sulfide-removed gas supply part 6 and the cooling part 7 as necessary.

Other Example

A hydrogen sulfide absorbing device of the present invention is not limited to the hydrogen sulfide absorbing device in the above-described embodiment.

Figure 4A:
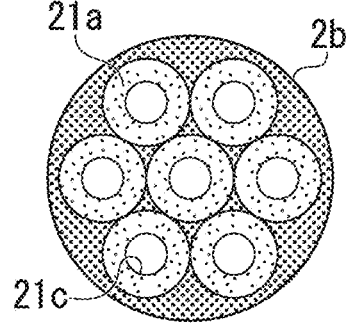
FIG. 4A is a schematic cross-sectional view for explaining another example of the hydrogen sulfide absorbing part and a cross-sectional view when viewed from a direction perpendicular to a length direction of an absorber case and FIG. 4B is a schematic cross-sectional view for explaining another example of the hydrogen sulfide absorbing part and a cross-sectional view when viewed from the length direction of the absorber case.

For example, a shape of the hydrogen sulfide absorber 2a in the hydrogen sulfide absorbing part 2 is not particularly limited. FIG. 4A is a schematic cross-sectional view for explaining another example of the hydrogen sulfide absorbing part and is a cross-sectional view when viewed from a direction perpendicular to the length direction of the absorber case.

As illustrated in FIG. 4A, a plurality of annular hydrogen sulfide absorbers 21a having a hollow flow path 21c formed in a center thereof may be disposed in the absorber case 2b to extend in the length direction of the absorber case 2b. As illustrated in FIG. 4A, the annular hydrogen sulfide absorbers 21a may have a substantially circular cross-sectional shape or a polygonal shape such as a substantially triangular or quadrangular cross-sectional shape. Furthermore, the number of annular hydrogen sulfide absorbers 21a is not particularly limited.

Figure 4B:
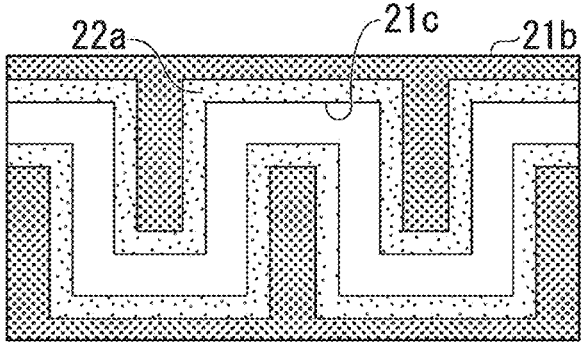

Also, a shape of the absorber case 21b in the hydrogen sulfide absorbing part 2 is not limited to a cylindrical shape and a shape of the flow path 2c is not limited to a linear shape. FIG. 4B is a schematic cross-sectional view for explaining another example of the hydrogen sulfide absorbing part and is a cross-sectional view when viewed from the length direction of the absorber case.

The absorber case 21b illustrated in FIG. 4B has a substantially square cylindrical shape. A bellows-shaped flow path 21c surrounded by the hydrogen sulfide absorber 22a is formed in the absorber case 21b. The bellows-shaped flow path 21c has a longer movement distance of the hydrogen sulfide-containing gas in the absorber case 21b than the linear flow path. As a surface area of a hydrogen sulfide absorber 22a in contact with the hydrogen sulfide-containing gas increases, an amount of hydrogen sulfide gas to be absorbed using the hydrogen sulfide absorber 22a increases. Therefore, when the absorber case 21b illustrated in FIG. 4B is provided, the hydrogen sulfide gas produced in the battery pack 1 can be more efficiently absorbed than when the absorber case 2b illustrated in FIGS. 2A and 2B is provided in some cases.

A shape of the absorber case may be a substantially triangular cylindrical shape, a substantially hexagonal cylindrical shape, or the like. Furthermore, the flow path may be a shape with a maze coefficient.

Also, although a case in which the sheet-like hydrogen sulfide absorber is used as the hydrogen sulfide absorber 2a has been described as an example in the above-described embodiment, the hydrogen sulfide absorber 2a is not limited to the sheet-like hydrogen sulfide absorber 2a and may be a powder-like hydrogen sulfide absorber. When the hydrogen sulfide absorber 2a has a power-like shape, unlike the examples illustrated in FIGS. 2A and 2B, the hollow flow path 2c is not formed inside the hydrogen sulfide absorber 2a installed in the absorber case 2b. When the hydrogen sulfide absorber 2a has the powder-like shape, the entire absorber case 2b of the hydrogen sulfide absorbing part 2 is filled with the hydrogen sulfide absorber 2a. Furthermore, the hydrogen sulfide-containing gas which has flowed into the absorber case 2b of the hydrogen sulfide absorbing part 2 passes in the hydrogen sulfide absorbing part 2 while being contact with the hydrogen sulfide absorber 2a in the gaps between the powder-like hydrogen sulfide absorbers 2a, unlike the examples illustrated in FIGS. 2A and 2B. Therefore, when the hydrogen sulfide absorber 2a is a powder, a volume of the hydrogen sulfide absorber 2a in contact with the hydrogen sulfide-containing gas which has flowed into the same absorber case 2b is larger than when the hydrogen sulfide absorber 2a has a sheet-like shape. That is to say, the hydrogen sulfide absorber 2a can increase an amount of hydrogen sulfide gas which can be absorbed.

Also, the hydrogen sulfide absorber 2a may be a solution containing one or more selected from alkaline substances such as NaOH, KOH, $Ca(OH)_2$, and $Mg(OH)_2$, metals such as Fe, Cu, and Ag, and oxides of these metals. As the above solution used as the hydrogen sulfide absorber 2a, it is preferable to use a copper nitrate aqueous solution. When the hydrogen sulfide absorber 2a is a solution, the hollow flow path 2c is not formed inside the hydrogen sulfide absorber 2a installed in the absorber case 2b, as in when the hydrogen sulfide absorber 2a has a powder-like shape. When the hydrogen sulfide absorber 2a is a solution, the hydrogen sulfide-containing gas is supplied into the solution of the hydrogen sulfide absorber 2a filled in the absorber case 2b and passes in the solution of the hydrogen sulfide absorber 2a while in contact with the hydrogen sulfide absorber 2a.

Also, the hydrogen sulfide absorbing device of the pre-vent invention may be a hydrogen sulfide absorbing device which includes a battery cell heating part configured to heat the all-solid secondary battery cells 1a in the battery pack 1 using the waste heat produced by the waste heat generator 51. Specifically, for example, the hydrogen sulfide absorbing device in which the waste heat gas is supplied into the battery pack 1 via the waste heat supply pipe 5a of the hydrogen sulfide absorber heating part 5 in the first embodiment or the waste heat supply pipe 50a of the hydrogen sulfide absorber heating part 50 in the second embodiment can be formed.

With such a hydrogen sulfide absorbing device, it is possible to prevent insufficient charging/discharging efficiency due to excessively low temperature of the all-solid secondary battery cells of the battery pack 1 and to efficiently perform charging/discharging in the all-solid secondary battery cells 1a.

Also, the hydrogen sulfide absorbing device of the present invention may include the heater configured to heat the hydrogen sulfide absorber. Known heaters can be used as the heater. In the hydrogen sulfide absorbing device including the heater configured to heat the hydrogen sulfide absorber, hydrogen sulfide gas can be absorbed using the hydrogen sulfide absorber which has been sufficiently heated using the heater. For this reason, it is possible to more efficiently absorb the hydrogen sulfide gas produced in the battery pack.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

10, 20 Hydrogen sulfide absorbing device
1 Battery pack
1a All-solid secondary battery cell
1b Battery case
2 Hydrogen sulfide absorbing part
2a Hydrogen sulfide absorber
2b Absorber case
2c Flow path
2d Inlet port
2e Outlet port
3 Hydrogen sulfide supply part
3a Hydrogen sulfide supply pipe
3b Air blower fan

3c Hydrogen sulfide pipe
4 Cooling gas supply part
4a Cooling gas supply pipe
4b Air blower fan
5, 50 Hydrogen sulfide absorber heating part
5a Waste heat supply pipe
5b Air blower fan
5c Mixing valve
6 Hydrogen sulfide-removed gas supply part
6a Hydrogen sulfide-removed gas supply pipe
6b Air blower fan
7 Cooling part
50a Waste heat supply pipe
50b Air blower fan
50c Space
50d Waste heat discharge pipe
50e Convex part
50f Main body
50g Absorber case installation region
51 Waste heat generator

What is claimed is:

1. A hydrogen sulfide absorbing device comprising:
a battery pack having an all-solid secondary battery cell;
a hydrogen sulfide supply part which supplies a hydrogen sulfide-containing gas produced in the battery pack to a hydrogen sulfide absorbing part;
a hydrogen sulfide absorbing part having a hydrogen sulfide absorber configured to absorb hydrogen sulfide gas contained in the hydrogen sulfide-containing gas;
a hydrogen sulfide absorber heating part which heats the hydrogen sulfide absorber using waste heat produced by a waste heat generator;
a cooling part which cools a hydrogen-sulfide-removed gas containing the hydrogen sulfide-containing gas in contact with the hydrogen sulfide absorber; and
a hydrogen sulfide-removed gas supply part which supplies the hydrogen-sulfide-removed gas cooled using the cooling part into the battery pack.

2. The hydrogen sulfide absorbing device according to claim 1, comprising:
a cooling gas supply part which supplies the hydrogen-sulfide-removed gas cooled using the cooling part to the waste heat generator.

3. A hydrogen sulfide absorbing device, comprising:
a battery pack having an all-solid secondary battery cell;
a hydrogen sulfide supply part which supplies a hydrogen sulfide-containing gas produced in the battery pack to a hydrogen sulfide absorbing part;
a hydrogen sulfide absorbing part having a hydrogen sulfide absorber configured to absorb hydrogen sulfide gas contained in the hydrogen sulfide-containing gas;
a hydrogen sulfide absorber heating part which heats the hydrogen sulfide absorber using waste heat produced by a waste heat generator; and
a heater which heats the hydrogen sulfide absorber.

* * * * *